United States Patent Office 3,467,137
Patented Sept. 16, 1969

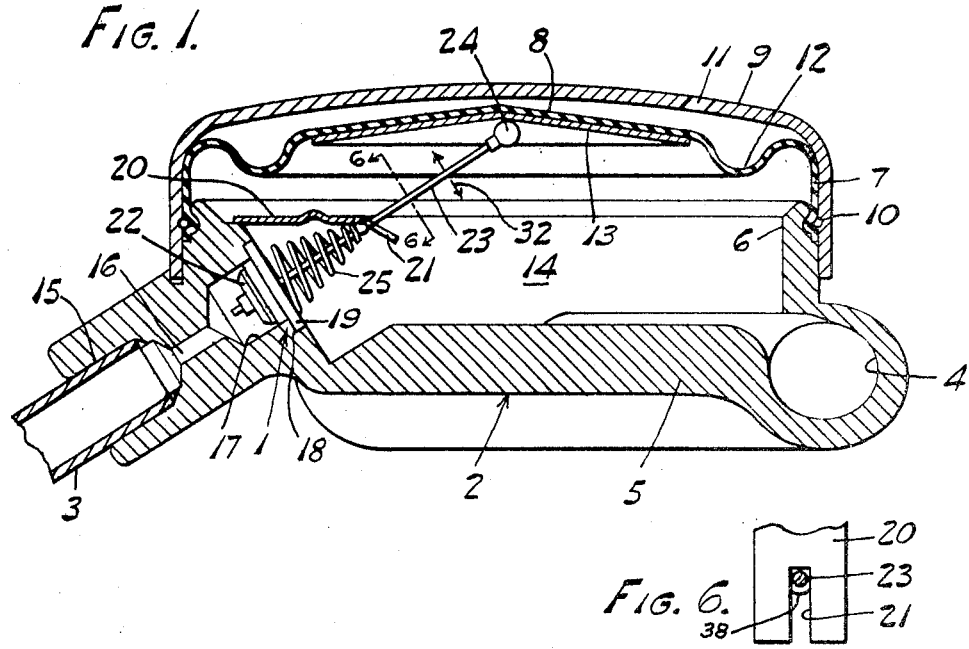
Fig. 1.
Fig. 6.
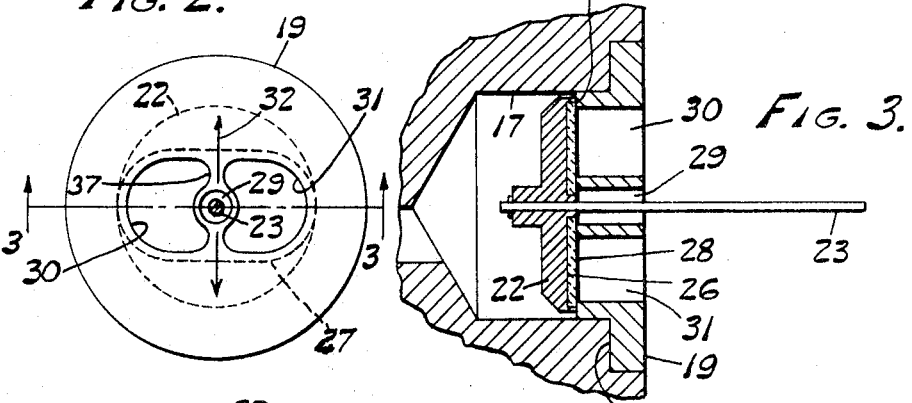
Fig. 2.
Fig. 3.
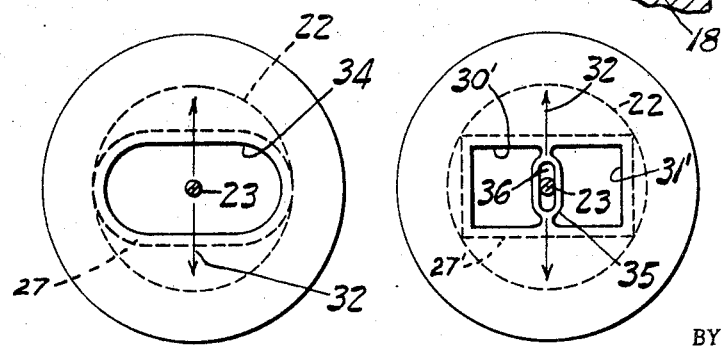
Fig. 4.
Fig. 5.
INVENTOR.
William H. Brown
BY Christel & Bean
ATTORNEYS

3,467,137
DEMAND VALVE
William H. Brown, Lancaster, N.Y., assignor, by mesne assignments, to "Automatic" Sprinkler Corporation of America, Cleveland, Ohio, a corporation of Ohio
Filed Sept. 2, 1965, Ser. No. 484,632
Int. Cl. F16k 1/18, 15/14; A61h 31/00
U.S. Cl. 137—494                    12 Claims This invention relates to improvements in breathing apparatus. More particularly, this invention relates to a valve which is employed in combination with a pressure regulating casing to control passage of breathing fluid in response to inhalation by a user of the breathing apparatus.

Numerous designs for demand valves have previously been suggested wherein inhalation by the user of a breathing apparatus controls opening and closing of the valve. In one such valve, a valve disc was provided with a centrally disposed circular aperture adapted to receive the tiltable stem of a valve head of circular cross-sectional design and with four or more circular orifices disposed about the aperture. While provision of the aperture permitted proper positioning of the valve head to prevent leakage through the orifices, the operation of such valve was found objectionable due to impedance of flow through the plural orifices of relatively small size.

It will be apparent that in all demand valves employed in breathing apparatus it is desirable to provide a maximum initial flow of fluid upon actuation of the valve, and to insure proper seating of the valve body and impede flow of fluid to a minimum extent, while permitting a user to open the valve with a minimum of effort. Heretofore no one has succeeded in satisfying all of the objects in a single valve structure.

Therefore it is an object of the present invention to provide a demand valve which, for any given size of valve seat orifice, is adapted to afford maximum initial flow of breathing fluid upon actuation of the valve.

A still further object is to provide a demand valve which upon opening offers minimum impedance to the flow of breathing fluid.

It is also an object to provide a valve body which does not require a predetermined orientation with respect to the seat of a demand valve.

In one aspect thereof, a demand valve of the present invention is characterized by the provision of a generally oval, somewhat elliptical or elongated rectangular valve seat and a generally circular valve body, the valve body tilting in the direction of the minor axis or short dimension of the seat thereby requiring less effort on the part of a user to open the valve.

Other objects, advantages, and characterizing features of my invention will become apparent from the following description and drawings in which:

FIG. 1 is a fragmentary section through a part of a pressure regulating casing equipped with an illustrative demand valve of the present invention;

FIG. 2 is a view taken from the right hand side of FIG. 3;

FIG. 3 is a sectional view taken axially through FIG. 2;

FIGS. 4 and 5 are views similar to FIG. 2 showing alternative embodiments of the demand valve of the present invention; and FIG. 6 is a sectional view taken along line 6—6 on FIG. 1.

Referring particularly to FIG. 1, a demand valve of the present invention, generally designated 1, is positioned within a pressure regulating casing, generally designated 2, and is employed to control passage of breathing fluid from a relatively high pressure supply line 3 to the mask of a user, not shown, through chamber outlet 4 in response to inhalation by a user of the apparatus.

The pressure regulating casing includes a base member 5 having a rim portion 6 over which is fitted the rim 7 of a flexible diaphragm 8 which may be formed of rubber or other suitable material. Rim 7 of diaphragm 8 may be held in engagement with rim 6 by any suitable means such as a split locking ring 10 which also can hold a cap 9 in place on rim 6. Cap 9 is provided with one or more vent openings 11, and may also be affixed to rim 6 in any desired manner, such as by press fitting, welding or by means of screw threads, not shown. Diaphragm 8 may be provided with suitable annular corrugations 12 adapted to bias it to the position shown, and a bearing plate 13 of metal or other suitable material is secured centrally to the side of the diaphragm 8 facing base member 5. Diaphragm 8, base 5 and rim 6 define a demand chamber 14 in pressure regulating casing 2.

As illustrated in FIG. 1, base member 5 is provided with an inlet bore opening 15 which is adapted to receive the end of high pressure supply line 3, a communicating bore 16, and a demand valve bore 17 which is enlarged to provide an annular shoulder 18 opposing the demand chamber 14. The demand valve 1 is affixed with respect to base member 5 by press fitting valve seat disc 19 into bore 17 against the annular shoulder 18, as shown in FIG. 3. Base member 5 is also employed to support a guide plate 20 which may be affixed to the base by any suitable means such as by welding. As shown in FIGS. 1 and 6, guide plate 20 is provided with a slotted guide opening 21, for the purpose more fully hereinafter described.

Referring particularly to FIGS. 1, 2 and 3, the demand valve of the present invention includes valve seat disc 19, a valve body 22, and a valve stem 23 having an enlarged spherical head portion 24. A coil spring 25 around stem 23 bears at one end against disc 19 and at its opposite end against an enlargement 38 on stem 23, and normally acts to bias sealing face 26 of valve body 22 into sealing engagement with seating face 27 of valve seat disc 19. Stem 23 has a head portion 24 normally in sliding engagement with plate 13 of diaphragm 8. If desired, valve body 22 may be provided with a disc of resilient material 28 adapted to sealingly engage the face 27 of valve seat disc 19. It will be noted that the seating face 27 of valve disc 19 is of an elongated, modified design, the sealing face 26 of valve body 22 being circular.

As illustrated in FIGS. 2 and 3, valve seat disc 19 is provided with an enlarged circular bore 29 adapted to slidably and tiltably receive stem 23, and a pair of generally kidney-shaped orifice passageways 30 and 31 which are symmetrically disposed on opposite sides of a vertical plane that is coplanar with the tilt axis of valve body 22 and its stem 23. It will be particularly noted that in this same vertical plane the axis of valve body 22 and stem 23 moves in the direction illustrated by arrows 32, upon opening and closing of the demand valve.

Referring particularly to FIGS. 1, 2 and 6, it will be seen that upon downward motion of diaphragm 8 in response to inhalation by a user, stem 23 and consequently valve body 22 and stem 23 are forced to swing against the bias of spring 25, as indicated by arrows 32; such swinging motion being assured by slot 21 of guide plate 20. This arrangement insures tilting of valve body 22 on the upper edge of valve seat 27 in the direction of the minor axis of valve seat 27, this being coincident with tilt axis 32. The distance measured from stem 23 along the axis 32 to seat 27 is relatively substantially shorter than the distance from stem 23 to seat 27 along an axis at right angles to axis 32, and therefore much shorter than the radius of a valve seat of conventional circular design having the same cross-sectional passage area. In this way there is provided mechanical advantage requiring less effort on the part of the user to effect opening of the demand valve. Also, the placement and design of passageways 30 and 31 permit greater initial flow of breathing fluid than would be realized in the conventional circular valve seat orifice of the same cross-sectional area.

FIG. 4 illustrates a modification of the valve seat orifice design of the present invention wherein the passageways 30 and 31 of the valve seat of FIG. 2 are replaced by a single orifice 34 of the same modified elliptical cross-sectional design as seat 27. This design permits even greater initial fluid flow than obtained by the orifice design of FIG. 2, because of the absence of the connecting web 37.

FIG. 5 illustrates another alternative embodiment of the present invention wherein the valve seat 27' is of a generally elongated rectangular configuration, with rectangular passageways 30', 31' symmetrically disposed on opposite sides of web 35.

It will be appreciated that central web 35 may be removed so as to obtain a design similar to that illustrated in FIG. 4. FIG. 5 also illustrates an alternative guide means adapted to control swinging motion of the valve body 22 and valve stem 23 in the form of an elongated slot opening 36 provided in web 35 of valve disc 19. Slot 36 may be employed to replace or to supplement the valve stem guiding action of guide slot 21.

Obviously, other seat configuration can be used in the valve of my invention, with the valve opening in the direction of the short dimension of the seat.

From the foregoing it will be seen that the present invention provides a novel demand valve which requires less effort on the part of the user and which permits a greater initial flow of breathing gas, when contrasted to a conventional demand valve employing a seat orifice of circular cross-sectional design and comparable cross-sectional passage size. Also it will be apparent that in the several embodiments of the present invention guide slot 21, aperture 29, and guide slot 36 act to insure proper positioning of the valve head 22 to prevent leakage. Utilization of a circular valve body having a radius sufficient to accommodate the long dimension of the seat avoids any need to orient the valve body relative to the seat.

Various modifications of the demand valve of the present invention will occur to those skilled in the art without deviating from the teachings of the present invention. Also it will be appreciated that the demand valve of the present invention may find utility in structures other than demand breathing apparatus.

What is claimed is:

1. A breathing apparatus comprising: a hollow casing having an opening in one wall thereof; a flexible diaphragm positioned in said opening and secured to said casing so that said diaphragm and said casing form a chamber, said casing having a fluid inlet adapted to be connected to a source of breathing fluid under pressure and a fluid outlet in communication with said chamber; means forming an orifice between said fluid inlet and said chamber; valve means operably associated with said orifice for controlling the flow of breathing fluid therethrough, said valve means including a valve body and a valve seat having an orifice defining seating surface, the lengthwise dimension of said surface being relatively greater than the widthwise dimension thereof, said diaphragm being responsive to differential variations in pressure within and without said chamber; means responsive to movement of said diaphragm for tilting said valve body to effect opening of said orifice; and guide means adapted to constrain tilting motion of said valve body to a plane normal to said lengthwise dimension of said valve seat surface.

2. The beathing apparatus of claim 1 wherein said diaphragm responsive valve body tilting means includes a valve stem having one end fixed to said valve body and having the other end thereof normally positioned in operable engagement with said diaphragm, and said guide means includes a guide plate fixed to said casing within said chamber, said guide plate being provided with an elongated guide slot adapted to slideably receive said valve stem.

3. The breathing apparatus of claim 1 wherein said diaphragm responsive valve body tilting means includes a valve stem having one end fixed to said valve body and having the other end thereof normally positioned in operable engagement with said diaphragm, said orifice forming means being in the form of a disc having a pair of orifices symmetrically disposed on opposite sides of an orifice dividing web, and said guide means including an elongated slot opening provided in said web, said slot opening being adapted to slideably receive said stem to constrain tilting motion of said valve body and stem to a plane disposed normal to the lengthwise dimension of said sealing surface.

4. The breathing apparatus of claim 1 wherein said seating surface is generally elliptical in design.

5. The breathing apparatus of claim 1 wherein said seating surface is of an elongated rectangular design.

6. A demand valve of the character described for controlling the flow of fluid from a pressurized source which comprises: a valve seat having an orifice therethrough, a valve body having an orifice sealing surface engaging said valve seat and tiltable on said seat to permit flow of fluid through said orifice, a valve stem fixed at one end to said valve head and projecting through said orifice in the direction of fluid flow, said seat having an orifice defining surface of an elongated design wherein the lengthwise dimension is relatively greater than the widthwise dimension thereof; means adapted to tilt said valve stem to tilt said valve head and thereby open said valve; and means adapted to constrain tilting motion of said valve stem and valve head to a plane disposed normal to said lengthwise dimension.

7. A demand valve of the character described for controlling the flow of fluid from a pressurized source which comprises: a body having a pair of orifices which are symmetrically disposed on opposite sides of a centrally disposed web member and an axially facing valve seat having a seating surface surrounding said orifices; an aperture disposed in said web member; a valve head having a sealing surface normally engaging said valve seat and tiltable to permit fluid flow through said orifices; a valve stem projecting from said valve head through said aperture in the direction of fluid flow through said orifices, said seating surface being of an elongated design wherein the dimension thereacross in one direction is relatively greater than the dimension thereacross in a direction normal to said one direction; means adapted to tilt said valve stem and said valve head to permit flow of fluid through said orifices; and means to constrain tilting motion of said valve head and said stem to a plane disposed normal to said one direction.

8. The demand valve of claim 7, wherein said seating surface is of a generally elliptical design flat-sided in said one direction thereof.

9. The demand valve of claim 7, wherein said seating surface is of an elongated rectangular design.

10. A demand valve of the character described for controlling the flow of fluid from a pressurized source which comprises: a body having an orifice surrounded and defined by a valve seat, a valve head having an orifice sealing surface engaging said valve seat and tiltable to permit flow of fluid through said valve, a valve stem projecting from said valve head in the direction of fluid flow, said seat being of an elongated design wherein the dimension thereacross in one direction is relatively greater than the dimension thereacross in a direction generally normal to said one direction; and means adapted to tilt said valve stem in a plane disposed generally normal to said one direction to tilt said head on said seat and thereby open said valve.

11. A demand valve as set forth in claim 10, wherein said valve body is generally circular.

12. A demand valve of the character described controlling the flow of fluid from a pressurized source which comprises: a body having an orifice, a web member in said orifice, and a valve seat surrounding and defining said orifice; an aperture disposed in said web member; a valve body having a sealing surface normally engaging said valve seat and tiltable thereon to permit fluid flow through said orifice; a valve stem projecting from said valve body through said aperture in the direction of fluid flow through said orifice, said seating being of a design wherein the dimension thereacross in one direction is relatively greater than the dimension thereacross in a direction generally normal to said one direction; and means adapted to tilt said valve stem in a direction generally normal to said one direction to open said valve.

References Cited

UNITED STATES PATENTS

| | | |
|---|---|---|
| 2,445,359 | 7/1948 | Meidenbauer. |
| 2,728,340 | 12/1955 | Meidenbauer. |
| 2,921,594 | 1/1960 | Mayo. |
| 3,145,721 | 8/1964 | Miller. |

WILLIAM F. O'DEA, Primary Examiner

R. GERARD, Assistant Examiner

U.S. Cl. X.R.

128—142.2; 139—355.23; 251—303